Figures 1, 2:
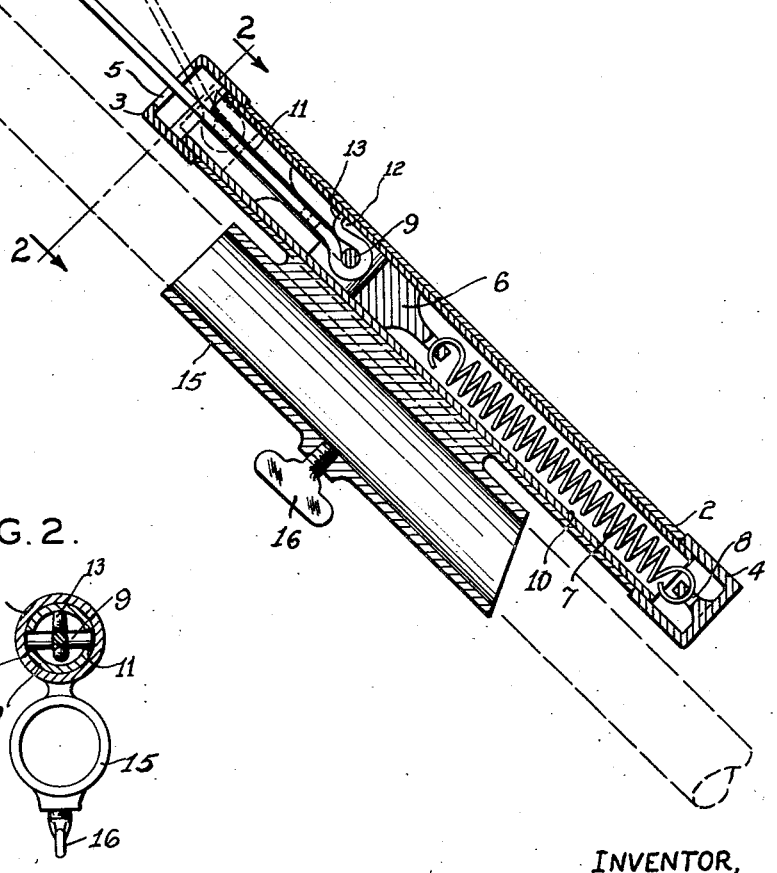

July 16, 1957

P. L. MILLER, SR 2,799,110

FISHING DEVICE

Filed June 15, 1955

INVENTOR,
PHILIP L. MILLER, SR.

BY: Ben V. Zillman
ATTORNEY.

2,799,110
FISHING DEVICE

Philip L. Miller, Sr., Florissant, Mo.

Application June 15, 1955, Serial No. 515,576

1 Claim. (Cl. 43—15)

This invention relates to fishing devices generally, but more especially to a device for attachment to any sort of rod or pole, or in fact to any suitable and convenient support, and with or without the use of a reel, to make the fishing success more certain after the fish takes the bait.

The invention has among its general objects the production of such a device that is neat and simple in appearance, construction and operation, readily secured to any rod or other supporting structure, positive in its action, relatively economical in cost and with practically no upkeep costs, and which will be otherwise safe, satisfactory and efficient wherever its use is deemed applicable.

One of the important objects of my invention is to so construct such a device, for mounting on the supporting structure, and which is operably controlled by the fish at the bait, to immediately thereafter jerk the fish hook firmly into the fish.

An added object of the invention is to construct such a device that may be set or put into operative position rapidly and without trouble and will occupy a minimum of space in the fishing gear equipment storage carriers.

Many other objects and advantages of the invention as herein shown and described will be obvious to those skilled in the art to which this invention appertains, and as will be evident from the disclosures herein given.

To this end, my invention consists in the novel construction, arrangement and combination of parts herein shown and described, all as will be more clearly pointed out in the claim hereunto appended.

In the drawings, wherein like reference characters represent like or corresponding parts throughout the views, Figure 1 is a longitudinal cross-section through the device, showing the trigger in two positions; and Figure 2 is a cross-sectional view of the same, taken substantially along the line 2—2 of Fig. 1.

Referring more particularly to the drawings, wherein I have illustrated a preferred form of my invention, there is shown a fishing line that may be connected at its rearmost end to any form of support, as for instance to a rod or pole, a boat, to a relatively fixed part of a wharf, etc., and used without or with a reel, as desired. The line 1 will have some sort of bait at its far end, in association with a fishing hook for entry into the fish in the usual manner (the far end of the line with its attached hook not being shown as the same does not form a part of the invention).

It is a too far common occurrence for a fisherman to lose the fish after the latter has taken the bait, and in my invention, I have constructed a device that is set into triggered position after the hooked end of the line has been sent out to the desired spot, and which is instantly released by any fish taking the bait, to give a quick jerk on said end of the line to thereby pull said hook firmly and positively into the jaws of the fish.

To this end in view, I provide an elongated tubular member 2 having a pair of end caps 3 and 4, respectively thereon, the forward cap 3 having a transversely elongated slot 5 therethrough for a purpose soon to be explained.

A plunger 6 is slidably mounted in said member or casing 2, there being a coil tension spring 7 having one end fastened to the rear end of said plunger and with its other end anchored to the rear cap, as by a loop 8 carried by the latter.

A pivot pin 9 extends transversely through the forward end of said plunger, with its ends projecting therebeyond, somewhat as shown, and in order to insure that said plunger will travel in a straight line within the casing and without relative rotation therebetween, I have interposed a sleeve 10 as a liner between said casing and plunger, and provided the forward end of said sleeve with a pair of diametral slots 11—11 to receive the projecting end portions of said pin and thereby guide the plunger in a true axial path as the latter moves in said casing, the forward end portion of said sleeve extending forwardly in advance of the corresponding end of said casing.

The forward end of said plunger is provided with a diametral slot 12 entirely therethrough, and a trigger means T is formed with an eye at its rearmost end to be received by said pin to afford hinged or pivotal movement to said trigger means.

The rearmost end of said trigger means has an offset portion 13 extending transversely to form a sear that engages against the adjacent terminal end of said sleeve after a predetermined amount of pivotal or angular rotation of said trigger means, as indicated.

Obviously, if the trigger means is actuated or forced forwardly relatively of the sleeve and casing, pulling the plunger forwardly at the same time, against the tension of said coil spring, and the sear is set into operative or ready-to-trip position, said spring will retract or retrieve said forwardly actuated parts rearwardly into the casing as soon as said sear is released by any force. The trigger means is set into said active or operative position by lifting it up slightly and pivoting it about its pin, as soon as the sear has passed the adjacent forward end of said sleeve.

The force of the spring maintains the sear in said set position until the trigger has been thereafter forced forwardly or tilted. The trigger rod extends through said elongated slot 5 in the cap, to permit of said pivotal movement of the rod about the pin.

For convenience, the trigger rod is bent intermediate its ends to form an open offset 14 that is handily engageable by the operator to lift the same into operative position.

The fishing line may be attached at its rear end to any preferred structure, as for instance to a rod or pole as indicated, and for this purpose there may be an auxiliary tube for mounting on said rod or pole, as indicated at 15 and to be tightened thereon with a suitable fastener 16.

The forward end of said trigger rod has an eye 17 thereat and through which the line is threaded.

Assuming that said device is in use, and that the trigger has been forced forwardly and tiltably lifted so that its sear portion is set into its cocked position, then as soon as there is any pull on the far end of the line, as by the fish taking the bait, such force immediately is transmitted to the trigger means, swinging the same about its pivot so that said sear portion is disengaged or released, whereupon the spring will forcibly and immediately retract or retrieve said trigger rod, thereby giving a sudden jerk to the hook to imbed the latter firmly into the jaws of the fish and insuring that the fish can be landed.

I claim:

A device for association with a hook-carrying fishing line, comprising a tubular casing adapted to be connected to a support and having a laterally elongated opening through its forward end, a plunger longitudinally reciprocatingly slidable in said casing, a coil spring yieldably maintaining said plunger retracted in said casing, a sleeve between said casing and plunger and having a slot that extends longitudinally through its side wall, said casing completely enclosing said sleeve, the forward end of said casing being spaced beyond the adjacent forward end of said sleeve, a pin carried by and transversely projecting from said plunger and slidably engageable in said slot to prevent rotation relatively between said plunger and sleeve, a fishing-line carrying trigger means longitudinally and tiltably movable through said elongated opening of said casing, said trigger means and having its rear end pivotally mounted on said pin and having a sear portion at said rear end for releasably interlocking against the forward end of said sleeve in such a manner as to be spaced from the forward end of said casing whereby the trigger means may be forced forwardly a predetermined distance when it is actuated by a pull forwardly on said line to release said sear portion and permit retrievement of the plunger.

References Cited in the file of this patent

UNITED STATES PATENTS

| | | |
|---|---|---|
| 711,318 | Humers | Oct. 4, 1902 |
| 1,295,448 | Dingwell | Feb. 25, 1919 |
| 2,590,721 | Muth | Mar. 25, 1952 |
| 2,706,866 | Lucchetti | Apr. 26, 1955 |